United States Patent [19]

Torquato

[11] 4,064,697

[45] Dec. 27, 1977

[54] ROTARY ENGINE

[76] Inventor: Michael Torquato, 2425 Edgebrook Ave., Pittsburgh, Pa. 15226

[21] Appl. No.: 714,112

[22] Filed: Aug. 13, 1976

Related U.S. Application Data

[63] Continuation-in-part of Ser. No. 531,678, Dec. 11, 1974, abandoned.

[51] Int. Cl.$^2$ .............................. F02G 3/00; F02C 5/06
[52] U.S. Cl. ..................................................... 60/624
[58] Field of Search .................... 60/39.44, 315, 624, 60/597

[56] References Cited

U.S. PATENT DOCUMENTS

| 1,240,366 | 9/1917 | Rasmusen | 60/39.44 |
| 1,322,577 | 11/1919 | Johnston | 60/624 |
| 3,000,707 | 9/1961 | Boustow | 60/315 |

FOREIGN PATENT DOCUMENTS

| 663,010 | 6/1938 | Germany | 60/624 |

Primary Examiner—Carlton R. Croyle
Assistant Examiner—Louis F. Casavepola
Attorney, Agent, or Firm—William J. Ruano

[57] ABSTRACT

A rotary engine comprising a rotor having mounted thereon a plurality of radially reciprocating pistons and a cam that controls the opening and closing of the compression chamber valves which are located, together with combustion chambers, beyond the radially outward ends of the pistons. By so remotely locating the combustion chambers and spark plugs therefor, the heat of combustion is separated from the pistons and cylinders, whereby they can operate in a relatively cool atmosphere, use very little oil and reduce wear of parts to an absolute minimum so as to lengthen the life of the pistons many fold. The rotary engine produces greater torque, uses less fuel per horsepower developed and emits less exhaust pollutants. Also there is less wearing of parts, therefore less maintenance and much longer life than engines of the prior art.

2 Claims, 4 Drawing Figures

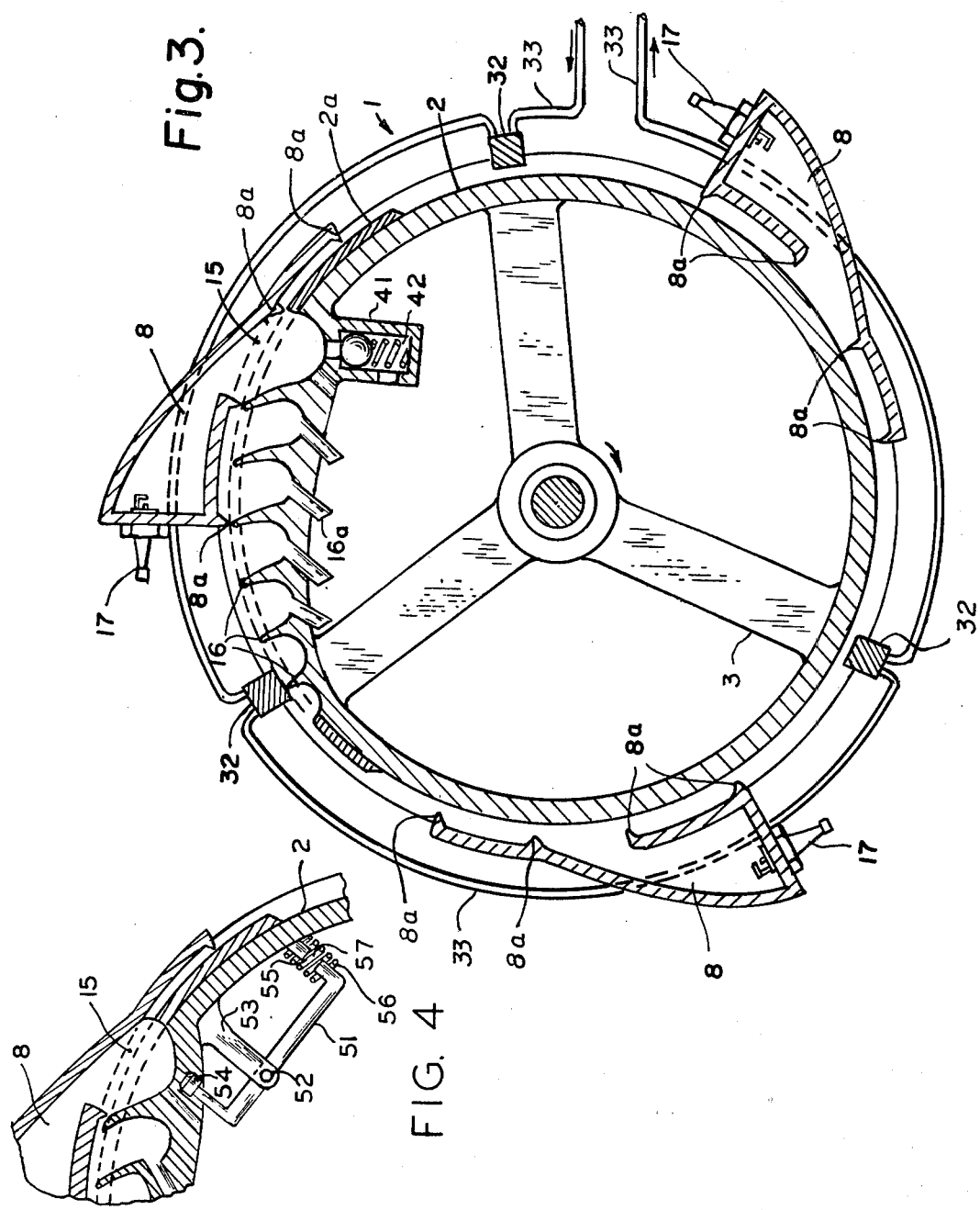

ROTARY ENGINE

This is a continuation-in-part of application Ser. No. 531,678 (abandoned) filed 12-11-74.

This invention relates to immmprovements in a rotary engine, and more particularly, to a rotary engine in which the pistons and cylinders are mounted on the rotor.

An outstanding disadvantage or presently used internal combustion engines, including rotary engines, is that their efficiency is relatively low and the torque developed in rotary engines is also relatively low as well as the horsepower developed per gallon of gasoline. Also they pollute the atmosphere in spite of precautions taken. Moreover, rotary engines are complicated in construction and are made of parts of very special construction, therefore increasing maintenance costs as well as replacement costs. Furthermore, because of the special seal that must be maintained at all times, down time recurs rather frequently.

An object of my invention is to provide a novel rotary engine that is devoid of the abovenamed disadvantages of prior rotary engines.

Another object of my invention is to provide a rotary engine of a construction so as to provide substantially greater torque and substantially greater developed horsepower than is obtainable by rotary engines of the prior art.

A more specific object of the invention is to provide a rotary engine wherein most of the parts are conventional and are relatively available, therefore are inexpensive such as cylinders and pistons that are mounted on the rotor, and wherein the maintenance cost, as well as the replacement costs, are considerably less than those for existing rotary engines.

Another object of the invention is to provide a highly efficient rotary engine wherein the fuel is thoroughly consumed, and the exhaust gases purified whereby the engine discharges practically no pollutants into the atmosphere.

Other objects and advantages will become more apparent from a study of the following description, taken with the accompanying drawings wherein:

FIG. 3 is a cross-sectional view taken along line 3—3 of FIG. 2; and,

FIG. 4 is a fragmentary view of a modification of the one-way valve shown in FIG. 3.

Figure 1:
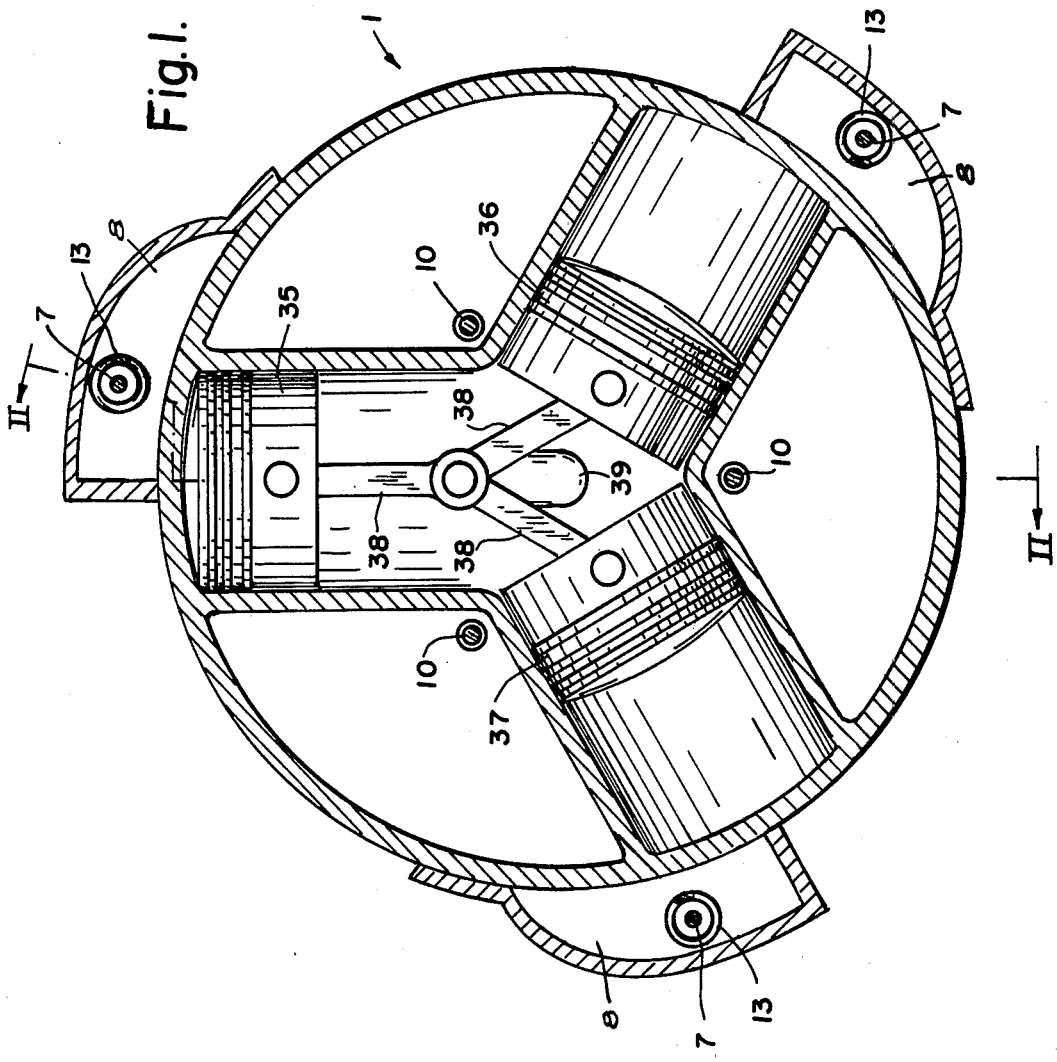
FIG. 1 is a plan or elevational view, partly in cross-section, showing the stator of a rotary engine embodying my invention.
Figure 2:
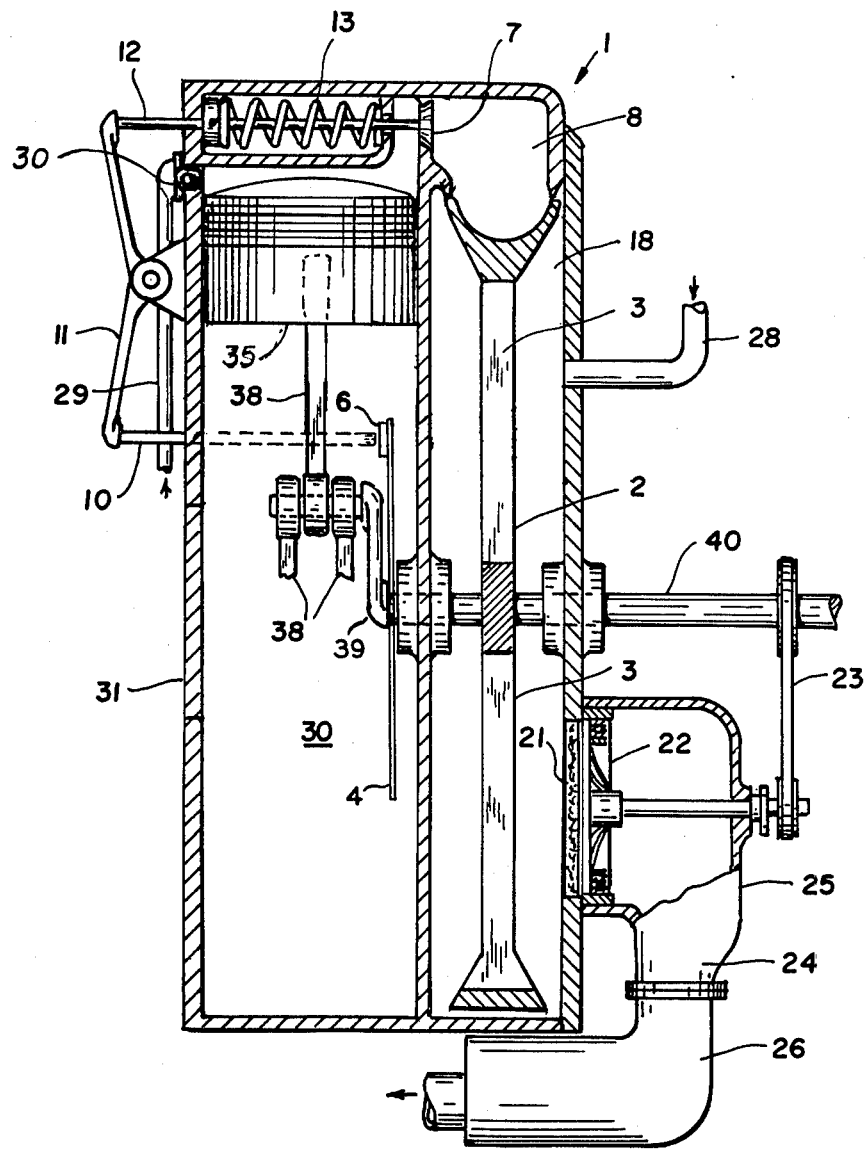
FIG. 2 is a vertical cross-sectional view taken along line II—II of FIG. 1.

Referring more particularly to FIGS. 1 and 2 of the drawings, numeral 1 generally denotes the stator of a rotary engine having three compressors.

Rotor 2 thereof (see FIG. 2) comprises a drive shaft 40 on which is mounted a crank arm 39 having a crank pin on which are pivotally connected three eccentrics or piston rods 38 connected to pistons 35, 36 and 37. This represents a three cylinder rotary motor equivalent to a 6 cylider internal combustion engine. Of course, a larger number of cylinders may be used in the present invention, such as 4, 5, 6, etc. cylinders. Rotor 2 (see FIGS. 2 and 3) has three radially extending arms 3 rigidly connected to drive shaft 40 and on which is mounted ring 4 having a cam 6 which has inclined end portions. The cam 6, through a linkage, is adapted to operate inlet valves 7, three of which are shown for purposes of illustration, for admitting gaseous fuel under pressure into the stationary combustion chambers 8. The operation of the valve operating means is as follows:

The cam 6, once every revolution of the rotor, will engage each of the valve actuating mechanisms comprising a connecting rod 10 which, in turn, is connected to a yoke or lever 11, pivotally mounted on the stationary housing 31 and whose end is connected to another connecting rod 12 to which the inlet valve 7 is rigidly mounted and which is yieldingly held in the closed position by helical spring 13. Each time the cam 6 actuates the connecting rod 10, the associated valve 7 will open and remain open during a substantially 60° rotary movement of the cam.

It should be understood that there are three inlet valves 7, each having a cam actuated operating mechanism as illustrated in FIG. 2 in the case of a three compression engine installation. Of course, if more than three pistons are used, such as 4, 5 or 6, there will be an equal number of inlet valves, such as 7, and combustion chambers, such as 8.

Turning now to the construction of the peripheral portion of the rotor 2, it will be noticed that there is an elevated or high rise portion 2a (FIG. 3) that extends throughout about one third of the entire periphery and the purpose of which is to form a slidable contact with radially inwardly projections 8a of the combustion chamber 8 to have the least friction and leak-proof resistance on the rotor and to close the chamber discharge or outlet opening 15 and prevent any escape of compressed fuel therefrom except through a one-way valve 41. It will also be noted that the rotor is provided with a series of peripherally dispoed vanes 16 forming portions of thrust pockets so that when the gaseous mixture, under pressure, enters the chamber 8 and is ignited by the spark plug 17, the explosion will cause the exertion of a force against vanes 16 as they successively pass by the opening 15, it being noted that the largest initial thrust from the explosion will be imparted to the largest vane and will exhaust through the one-way valve 41 normally closed by spring 42 and upon further rotation of the rotor, successive vanes of smaller length will be presented so as to provide a succession of pulses or thrusts by the successively smaller vanes and thrust pockets, each having an exhaust port 16a. This will effectively consume all the droplets of the gaseous mixture and will leave a minimum of exhaust gases, which exhaust gases will be drawn by suction into the chamber 18.

While only one one-way valve 41 is shown, several others or all of the remaining thrust pockets may be provided with one-way valves to allow a greater pressure build-up in the thrust pockets before exhausting.

In order to form a seal of long life between the projection 8a and the high rise portion 2a, lubricating boxes 32 are provided with packing filled with lubricant that will lubricate the high rise portion 2a as it revolves to minimize friction. One end of tube 33 is connected to an oil reservoir and the other, to a rotary pump to supply oil to boxes 32. Instead, the high rise portion itself may have a coated metal, such as a soft metal, for example, copper, to provide a good sealing contact and eliminate the necessity of lubricating boxes 32.

In operation, assume that the inlet valve 7 is closed and that the rotor is turning clockwise and is in such position that the high rise portion 2a thereof just comes into contact with the first projection 8a of the combustion chamber 8. At this time, the inlet valves 7 were closed. Shortly after such contact with the high rise portion 2a, the leading inclined portion of the cam 6 will actuate the valve operating mechanism hereinbefore described so as to force the associated inlet valve 7 open against the restraining action of the spring 13. As the result of opening the valve 7, the combustion chamber 8 is pressurized, by piston 35, with gaseous fuel and when the trailing end of the cam 6 allows the valve 7 to close again, the spark plug 17 will ignite and cause the gaseous mixture in combustion chamber 8 to explode and to effect a series of thrusts against the successive vanes 16, forming successive applications of force to the periphery of the rotor 2, which is the portion having the greatest moment arm from the axis of the rotor, thus producing maximum torque. The explosion exhausts through exhaust ports 16a of the respective thrust pockets.

FIG. 4 shows a modification and improvement of a one-way valve 42 shown in FIG. 3 since it can better stand the heat developed as a consequence of the explosion and exhaust of gases in the thrust pockets. The valve comprises a lever 51 pivoted at 52 and having a return spring 56 encircling seating elements 56 so as to normally bias the valve element 54 in the closed position. As a consequence of the explosion in pocket 15, valve 54 will be unseated against the action of spring 56 and will allow exhaust of the gases of explosion.

After the last impuse is made on the smallest or trailing vane, the high rise portion 2a terminates and the radially inwardly extending portions 8a no longer contact the rotor periphery, therefore permits the exhaust gases to escape from the outlet opening 15 and to be discharged by suction through a catalyst 21 by rotation of a suction fan 22 which is driven by the rotor shaft through pulley 23 or other suitable drive contained within housing 25. If more than a one stage catalyst is desired, it may be connected in series with the outlet 24 of the chamber 25. Numeral 26 denotes a second stage catalyst in series with the first stage catalyst, allowing the exhaust to discharge into the atmosphere from the outlet 26a.

Inlet air is drawn into the rotor housing through pipe 28. Fuel is drawn into the cylinder through the fuel and air inlet pipe 29 connected to the carburetor, flowing freely through one-way valve 30 which closes when the piston raises.

Thus it will be seen that I have provided an efficient rotary engine having reciprocating pistons which are mounted on the rotor and having each combustion chamber therefor mounted beyond the periphery of the stator so that the heat of combustion is quite remote from the pistons and cylinders, therefore will not cause the usual high consumption of oil and, instead, will use practically no oil within the oil chamber 30 covered by a cover plate 31; furthermore, I have provided a rotary engine which, by virtue of application of successive thrusts to vanes disposed at the periphery, will provide a maximum moment arm, therefore maximum torque or horsepower for a given amount of gasoline, as compared to present day rotary engines wherein the explosion occurs inside the stator; furthermore, I have provided a rotary engine wherein a series of vanes of progressively smaller size are employed to give a large number of sequential impulses or thrusts resulting in a relatively constant speed drive and complete combustion of gaseous fuel with a minimum amount of exhaust fumes; and which is provided with first and possibly a second stage catalyst in the exhaust portion of the system, which results in practically no emission of pollutants into the surrounding atmosphere; furthermore, I have provided a rotary engine wherein 3, 4, 5 or any additional numbers of pistons and cylinders may be mounted radially of a rotor, each of which will cause two complete reciprocations per revolution of the rotor and will be the equivalent of twice the number of cylinders in conventional internal combustion engines.

While I have illustrated and described a single specific embodiment of my invention, it will be understood that this is by way of illustration only and that various changes and modifications may be contemplated in my invention and within the scope of the following claims.

I claim:

1. A rotary engine comprising a rotor driven by at least three radially extending pistons reciprocating in corresponding stationary cylinders, said pistons being connected by crank arms to a rotor shaft, each cylinder being supplied by fuel and air from a carburetor through a one-way valve, a stator having a corresponding number of peripherally spaced combustion chambers located adjacent the radially outward extremities of the cylinders, one combustion chamber for each cylinder each combustion chamber including an inlet valve located at the extremity of the associated cylinder, cam means mounted on said rotor, means for adjusting the position of said cam means about the axis of said rotor, means mounted on said stator and operated by said cam means to open each valve upon each rotation of said rotor, a plurality of peripherally disposed vanes of progressively decreasing size on the periphery of said rotor defining pockets of varying sizes, an exhaust port in each pocket leading to the interior of said rotor, a spark plug at each inlet valve for igniting the fuel in said combustion chambers each time that the outlet of each chamber confronts said pockets defined by said vanes to provide successive power thrusts, the outlet of each of said chambers being in sealing engagement with the outermost tips of said vanes, a partition forming a separate enclosure for a portion of said rotor in said stator, and an exhaust fan in said separate enclosure which is driven by said rotor shaft for drawing exhaust fumes from the interior of said separate enclosure and expelling them to the surrounding atmosphere and including a catalyst in the intake portion of said fan.

2. A rotary engine as recited in claim 1 together with a high rise portion extending beyond both end portions of each of said plurality of vanes to provide a seal with the terminal portions of each combustion chamber.

* * * * *